US011853840B2

(12) United States Patent
Naney

(10) Patent No.: US 11,853,840 B2
(45) Date of Patent: Dec. 26, 2023

(54) INDUSTRIAL DIGITAL BARCODE READER

(71) Applicant: ZEBRA TECHNOLOGIES CORPORATION, Lincolnshire, IL (US)

(72) Inventor: Alexander J. Naney, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 508 days.

(21) Appl. No.: 16/669,210

(22) Filed: Oct. 30, 2019

(65) Prior Publication Data

US 2021/0133409 A1    May 6, 2021

(51) Int. Cl.
*G06K 7/10*      (2006.01)
*G06K 7/14*      (2006.01)

(52) U.S. Cl.
CPC ....... *G06K 7/10881* (2013.01); *G06K 7/1098* (2013.01); *G06K 7/10831* (2013.01); *G06K 7/10851* (2013.01); *G06K 7/1417* (2013.01)

(58) Field of Classification Search
CPC ................................................ G06K 7/10881
USPC .................................................. 235/472.01
See application file for complete search history.

(56) References Cited

U.S. PATENT DOCUMENTS 5,416,463 A * 5/1995 Higgins, Jr ............ G10K 11/08
                                                  235/462.45
2008/0302873 A1* 12/2008 Kotlarsky .......... G06K 7/10712
                                                  235/462.15

* cited by examiner

*Primary Examiner* — Rafferty D Kelly
(74) *Attorney, Agent, or Firm* — Yuri Astvatsaturov

(57) ABSTRACT

A barcode reader assembly for capturing at least one object appearing in a field of view (FOV) is provided that includes a reader enclosure, a circuit board to capture and decode the image, an imaging system, a sound generator housing, and a sound generator. The reader enclosure has an internal cavity in which the circuit board is disposed. The sound generator housing is operably coupled with the circuit board and includes at least one wall having at least one sound port and extending upwardly from the circuit board to form a sound chamber. The sound generator is operably coupled with the circuit board and is at least partially disposed within the sound chamber to generate a sound at a resonant frequency. The sound generator housing is dimensioned to amplify the resonant frequency of the sound generator and port the generated sound to the internal cavity of the reader enclosure.

11 Claims, 5 Drawing Sheets

INDUSTRIAL DIGITAL BARCODE READER

BACKGROUND OF THE INVENTION

Barcode and other scanning devices generally capture images within a given field of view (FOV). In some instances, handheld barcode readers may be used in clean and/or sterile environments. Handheld barcode readers oftentimes come equipped with sound generating mechanisms to provide audible feedback to users. These sound generating mechanisms typically include a chamber that exits to a port or an opening to allow sound generated by the mechanisms to exit to an environment external to the barcode reader. However, when these barcode readers are used in sterile and/or clean environments, such handheld barcode readers may need to be sealed in order to avoid ingression of cleaning product into the device. As a result, the sealed configuration of the barcode reader can reduce the effectiveness of sound chambers by eliminating porting mechanisms to ambient air, thus resulting in a muffled or Accordingly, there is a need for improved devices having improved functionalities.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
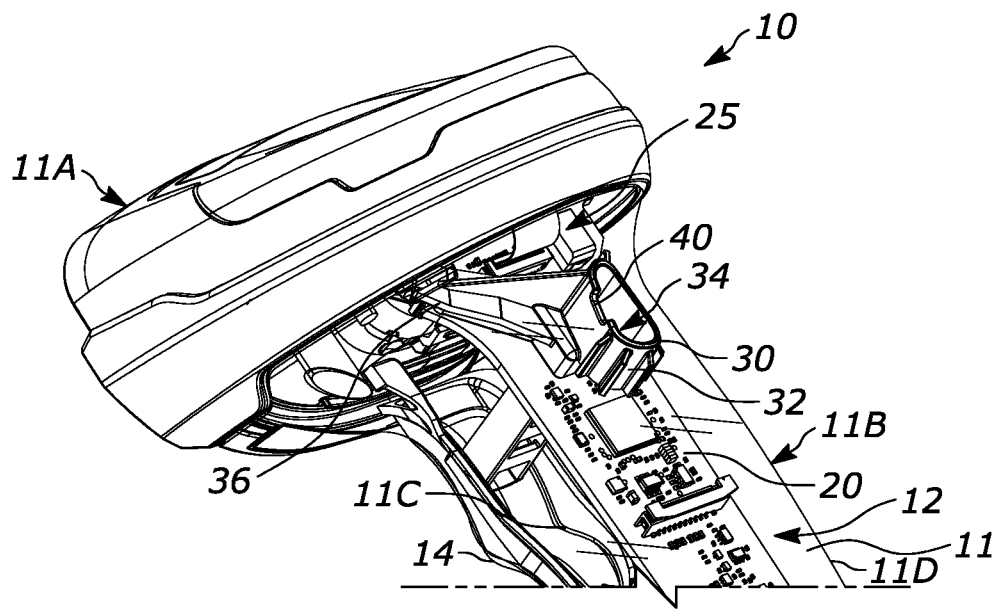
FIG. 1 is a perspective view of a portable, industrial digital barcode reader assembly having an internally ported sound chamber in accordance with this disclosure.
Figure 2:
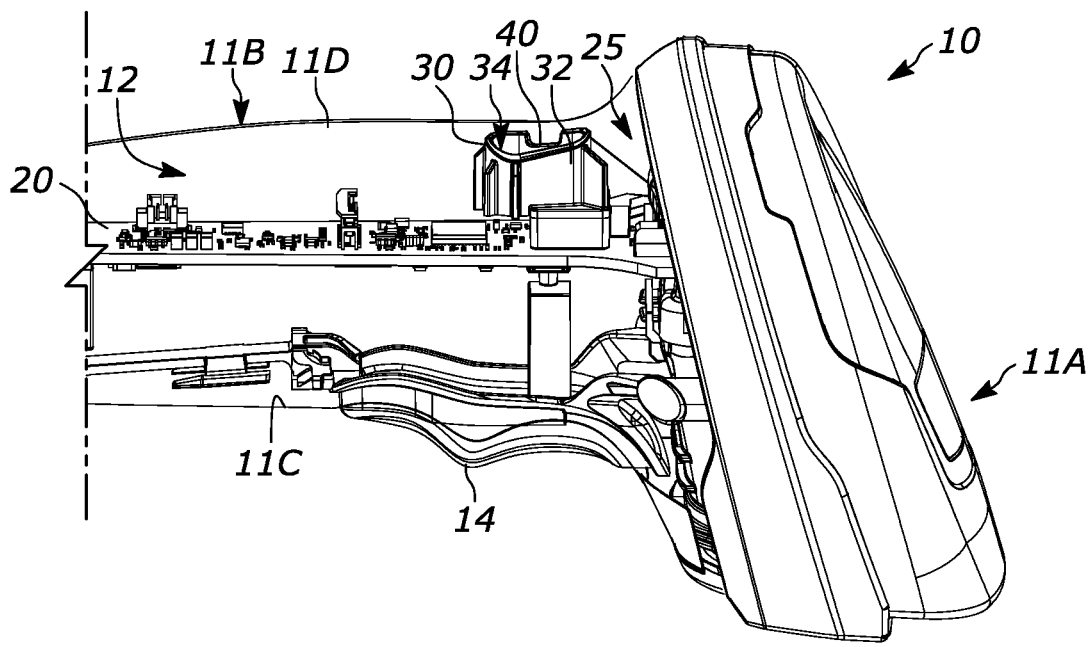
FIG. 2 is a side elevation view of the industrial digital barcode reader assembly of FIG. 1 in accordance with this disclosure.
Figure 3:
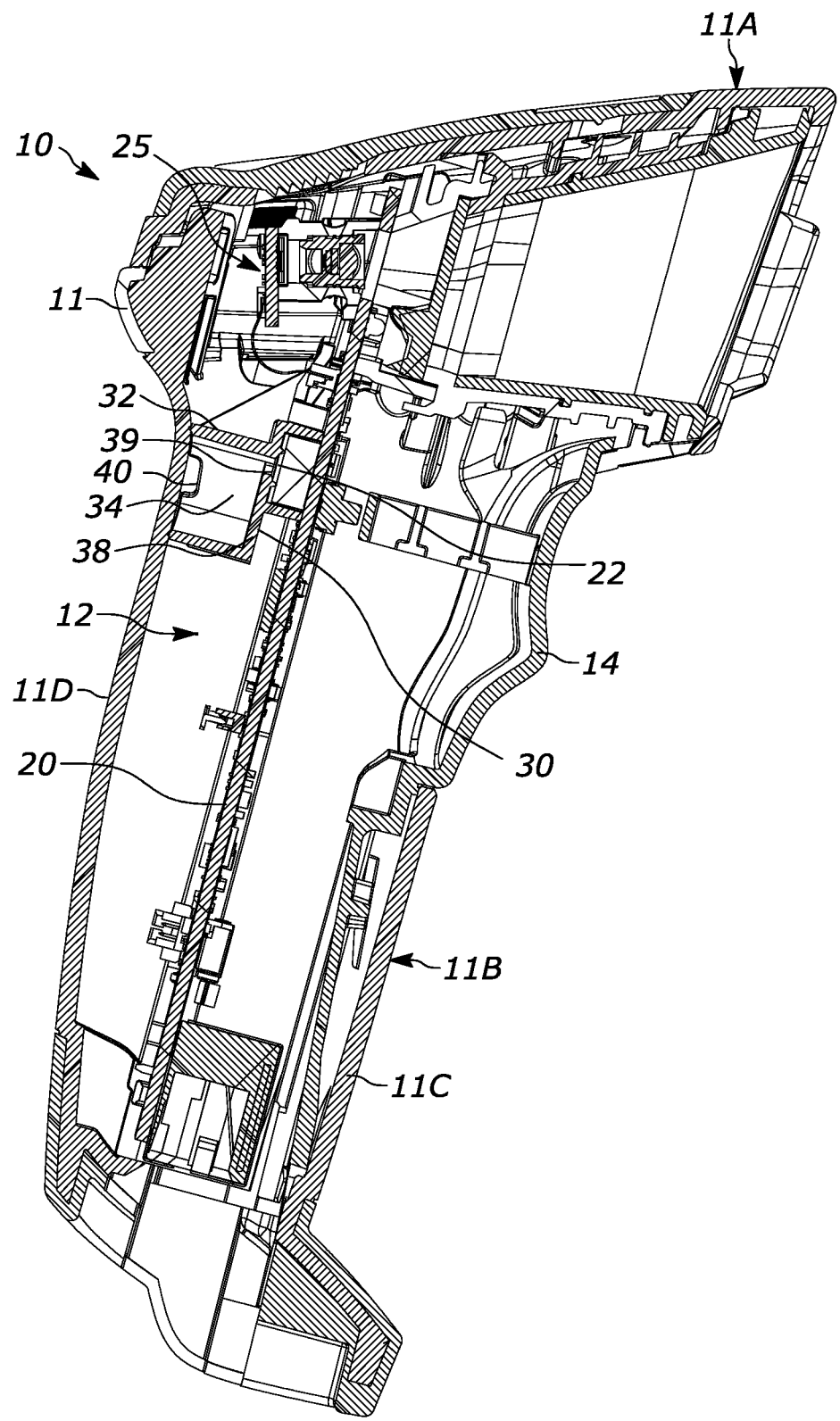
FIG. 3 is a side elevation cross sectional view of the industrial digital barcode reader assembly of FIGS. 1 and 2 in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an embodiment, the present application provides a barcode reader assembly for capturing at least one object appearing in a field of view (FOV) is provided that includes a reader enclosure, a circuit board to capture and decode the image, an imaging system, a sound generator housing, and a sound generator. The reader enclosure has an internal cavity in which the circuit board is disposed. The sound generator housing is operably coupled with the circuit board and includes at least one wall having at least one sound port and extending upwardly from the circuit board to form a sound chamber. The sound generator is operably coupled with the circuit board and is at least partially disposed within the sound chamber to generate a sound at a resonant frequency. The sound generator housing is dimensioned to amplify the resonant frequency of the sound generator and port the generated sound to the internal cavity of the reader enclosure.

In some examples, the at least one wall contacts a portion of the reader enclosure to define the sound chamber. Further, in some approaches, the sound generator housing may include a Helmholtz resonator.

In some aspects, the sound generator may be in the form of a beeper. In some of these examples, at least a portion of the internal cavity of the reader enclosure is sealed from an environment outside of the reader enclosure.

In accordance with another implementation, a method of assembling a barcode reader for capturing at least one image of an object appearing in a FOV includes providing a reader enclosure having an internal cavity. A circuit board and an imaging system are disposed within the internal cavity. The method further includes operably coupling a sound generator with the circuit board. The sound generator is configured to generate a sound at a resonant frequency. A sound generator housing is also coupled with the circuit board. The sound generator housing includes at least one wall that extends upwardly from the circuit board to form a sound chamber and includes at least one sound port. The sound generator housing is dimensioned to amplify the resonant frequency of the sound generator and port the generated sound to the internal cavity of the reader enclosure.

As previously noted, the reader assembly captures at least one image of an object appearing in a FOV. One such example of an object is a barcode. As used herein the term barcode may refer to one-dimensional or two-dimensional barcodes and/or other symbologies used to encode information associated with items.

Generally speaking, the present application is directed to an industrial digital barcode reader that may be used in clean and/or sterile environments such as healthcare facilities. These devices are typically sealed to external environments due to the need for equipment to be cleaned and/or disinfected via cleaning products which may be potentially harmful to electronic components of the industrial digital barcode reader. Accordingly, the present application describes an internal sound generator that effectively amplifies sound to audible levels.

Turning to the figures, reference numeral 10 generally identifies a handheld barcode reader assembly that includes a reader enclosure 11 in the form of a gun-shaped housing having an internal cavity 12. The barcode reader assembly 10 further includes a circuit board 20 disposed within the internal cavity 12, a sound generator 22, an imaging system 25 including an imaging sensor, and a sound generator housing 30, each of which is disposed within the internal cavity 12. The barcode reader assembly 10 may include any number of additional components such as, for example, a lens and/or lens arrangement, a power source, a trigger assembly, and the like to assist in capturing at least one image of an object appearing in a field of view (FOV).

The reader enclosure 11 includes a head portion 11a, handle portion 11b, a first shell member 11c, and a second shell member 11d. The head portion 11a generally accommodates the imaging system 25 and includes a window or lens that allows the imaging sensor to capture the at least one image. The handle portion 11b includes a trigger mechanism 14 that activates the imaging system 25 to capture and decode the at least one image appearing in the FOV. In some examples, the reader enclosure 11 forms a sealed internal cavity 12. Put differently, when assembled, the reader enclosure 11, may act as a barrier between the internal cavity 12 and the exterior environment. In some examples, the reader enclosure 11 may be in the form of first and second shell members that are operably coupled with each other via fasteners or other suitable coupling mechanisms.

The reader enclosure 11 may include any number of mounting mechanisms such as posts, flanges, ledges, channels, and the like, to receive the electrical and/or mechanical components of the handheld barcode reader 10. For example, the circuit board 20 may be operably coupled with the reader enclosure 11 via any one or ones of these mounting mechanisms. The circuit board includes electronic, mechanical, and/or any other components used to assist with operating the barcode reader assembly 10. As illustrated in the Figures, the circuit board 20 is generally disposed within the handle portion 11b of the reader enclosure, but in other examples, the circuit board 20 may be disposed in other locations.

The sound generator 22 is operably coupled with the circuit board 20. In some examples, the sound generator 22 may be secured to the circuit board 20 via any number of suitable approaches such as, for example, via soldering, adhesives, retaining members such as clips, and the like. In some examples, the sound generator 22 is in the form of a beeper that operates (i.e., emits sound upon receiving a control signal) at one frequency. Other examples are possible.

The sound generator housing 30 is operably coupled with the circuit board 20. In some examples, the sound generator housing 30 is constructed from a rubber material such as such as Dynaflex g7960. Other examples possible. The sound generator housing 30 includes at least one wall 32 that is configured to extend upwardly from the circuit board 20. More specifically, the at least one wall 32 defines an opening in the form of a sound chamber 34. While the illustrated embodiment of the sound generator housing 30 includes a single, continuous wall 32, in other examples, a number of segmented walls that are operably joined together may be used to form the wall 32. Other examples are possible. As shown in the Figures, the sound generator housing 30 further includes any number of additional support and/or mounting features 36 to assist in coupling the sound chamber 30 with the circuit board 20.

Figure 4:
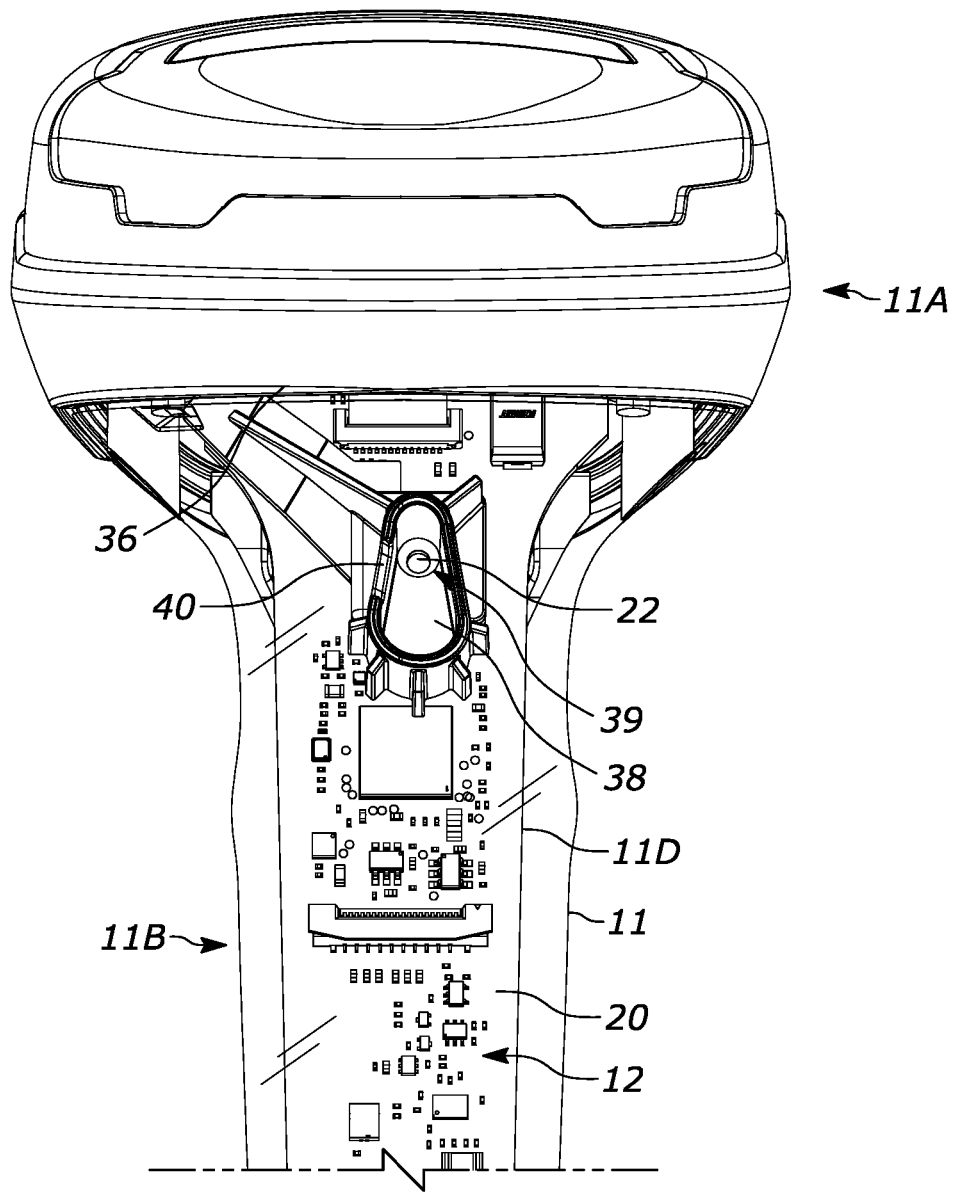
FIG. 4 is a rear elevation view of the industrial digital barcode reader assembly of FIGS. 1-3 in isolation in accordance with this disclosure.
Figure 5:
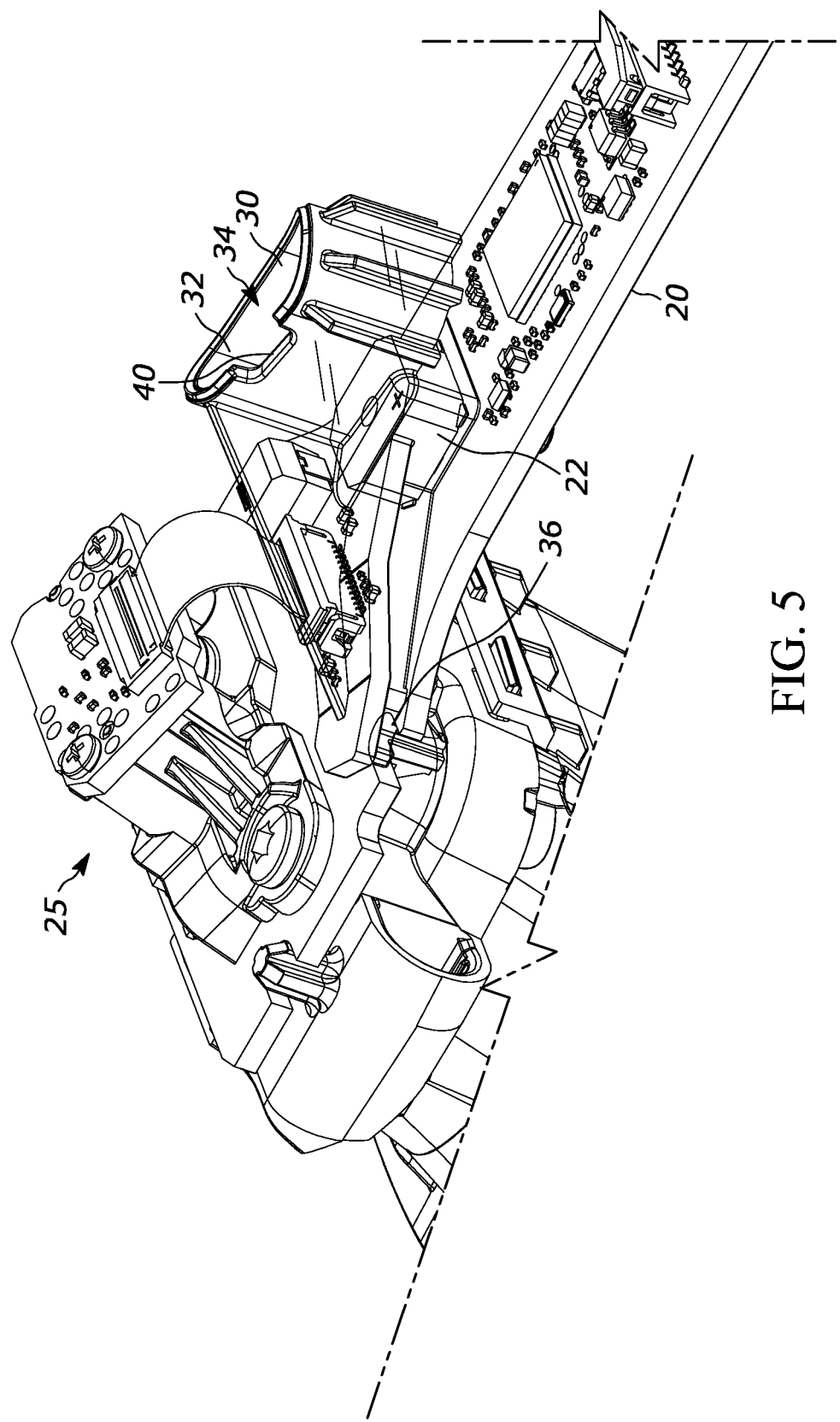
FIG. 5 is a close-up perspective view of the industrial digital barcode reader assembly of FIGS. 1-4 in accordance with this disclosure.
Figure 6:
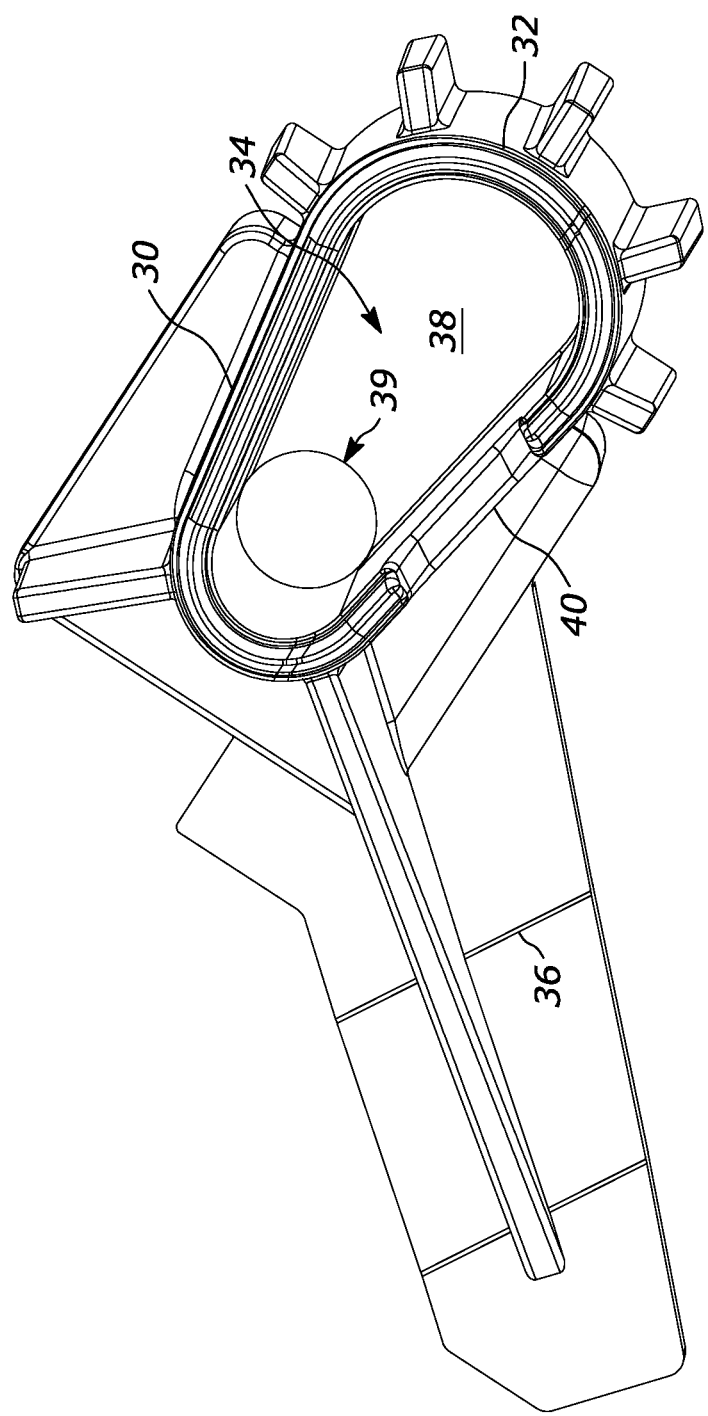
FIG. 6 is a top elevation view of a sound generator housing for use with the industrial digital barcode reader assembly of FIGS. 1-5 in isolation in accordance with this disclosure.

As illustrated in FIGS. 4 and 6, the sound generator housing 30 additionally includes a bottom wall 38 forming an opening 39 that accommodates at least a portion of the sound generator 22. Accordingly, sound generated by the sound generator 22 enters the sound chamber 34.

The sound generator housing 30 is configured to cooperate with the reader enclosure 11 to sealingly form the sound chamber 34. More specifically, as previously noted, the wall 32 is configured to extend outwardly from the circuit board 20. The handheld barcode reader 10 is assembled by disposing the circuit board 20 and the imaging system 25 within the internal cavity 12 of the reader enclosure 11 and operably coupling the sound generator 22 with the circuit board 20. The sound generator housing 30 is also operably coupled with the circuit board 20. When assembling the reader enclosure 11, the second shell member 11d is aligned with the first shell member 11c, which causes the wall 32 to contact an inner surface of the second shell member 11d. By securing (e.g., via a fastener or other coupling mechanism) the first and second shell members 11c, 11d together, the second shell member 11d compresses the sound generator housing 30, thus forming a seal therewith. As a result, the sound chamber 34 is sealed.

The sound generator housing 30 additionally includes at least one port 40 formed along the at least one wall 32. The size of the port 40 and the total volume of the sound chamber 34 are selected such that the sound chamber 34 forms a Helmholtz resonator. More specifically, the sound chamber 34 and the port 40 are dimensioned such that the sound chamber emits a desired frequency (e.g., the resonant or operating frequency of the sound generator 22) at a higher pressure level when experiencing the frequency. In other words, when the sound generated by the sound generator 22 exits the sound chamber 34 via the port 40, the frequency is amplified, thereby increasing the volume of the generated sound.

As a non-limiting example, a sound generator 22 may have a resonant frequency of approximately 3 kHz. In some examples, the dimensions of the sound chamber 34 and the port 40 may be calculated to result in a resonant frequency of approximately 3 kHz. For example, an example sound chamber 34 may have a volume of approximately 500 mm$^3$ which may combine with an internal volume of the sound generator 22 (e.g., approximately 88 mm$^3$) to result in an overall volume of approximately 588 mm$^3$. Accordingly, the port 40 may be dimensioned to have an area of approximately 6.2 mm$^2$. Such dimensions may be used to calculate a resonant frequency of approximately 3 kHz. In other examples, dimensions of the sound chamber 34 and the port 40 may be first identified, and a resonant frequency may then be calculated therefrom. Upon determining the resonant frequency of the sound chamber 34, a particular sound generator 22 that operates at this resonant frequency may be selected.

Upon the sound generated by the sound generator 22 exiting the port 40, the amplified sound enters into the remaining internal cavity 12 of the reader enclosure and is may be heard by a user. So configured, the described barcode reader assembly 10 is capable of producing audible levels that are at and/or approaching audible levels of externally ported designs.

In other examples and/or implementations, the sound generator 22 may be mounted to and/or coupled with a flexible circuit board to allow for placement in different locations within the reader enclosure 11 so long as the sound generator housing 30 may form a sealed (with exception of the port 40) sound chamber 34 with the reader enclosure 11. In other examples, the sound generator housing 30 may be a separate sealed component that needn't engage with a portion of the reader enclosure. Such an arrangement may still implement a port 40 to amplify the resonant frequency of the sound generator 22.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A barcode reader for capturing at least one image of an object appearing in a field of view (FOV), the barcode reader comprising:
    a reader enclosure having an internal cavity;
    a circuit board disposed within the internal cavity;
    an imaging system operably coupled with the circuit board to capture and decode the at least one image of the object appearing in the FOV;
    a sound generator housing operably coupled with the circuit board, the sound generator housing including at least one wall extending upwardly from the circuit board to form a sound chamber, the at least one wall including at least one sound port, and
    a sound generator operably coupled with the circuit board and being at least partially disposed within the sound chamber, the sound generator configured to generate a sound at a resonant frequency;
    wherein the sound generator housing is dimensioned to amplify the resonant frequency of the sound generator and port the generated sound to the internal cavity of the reader enclosure.

2. The barcode reader of claim 1, wherein the at least one wall contacts a portion of the reader enclosure to define the sound chamber.

3. The barcode reader of claim 1, wherein the sound generator housing comprises a Helmholtz resonator.

4. The barcode reader of claim 1, wherein the sound generator comprises a beeper.

5. The barcode reader of claim 1, wherein at least a portion of the internal cavity of the reader enclosure is sealed from an environment outside of the reader enclosure.

6. The barcode reader of claim 1, wherein the sound generator housing is at least partially constructed from rubber.

7. A method of assembling a barcode reader for capturing at least one image of an object appearing in a field of view (FOV), the method comprising:

providing a reader enclosure having an internal cavity;

disposing a circuit board within the internal cavity;

disposing an imaging system within the internal cavity and operably coupling the imaging system with the circuit board, the imaging system configured to capture and decode the at least one image of the object appearing in the FOV;

operably coupling a sound generator with the circuit board, the sound generator being configured to generate a sound at a resonant frequency;

operably coupling a sound generator housing with the circuit board, the sound generator housing including at least one wall extending upwardly from the circuit board to form a sound chamber, the at least one wall including at least one sound port;

wherein the sound generator housing is dimensioned to amplify the resonant frequency of the sound generator and port the generated sound to the internal cavity of the reader enclosure.

8. The method of claim 7, wherein the at least one wall is dimensioned to contact a portion of the reader enclosure to define the sound chamber.

9. The method of claim 7, wherein the sound generator housing forms a Helmholtz resonator.

10. The method of claim 7, further comprising sealing at least a portion of the internal cavity of the reader enclosure from an environment outside of the reader enclosure.

11. The method of claim 7, wherein the sound generator housing is at least partially constructed from rubber.

\* \* \* \* \*